(No Model.)

C. E. MILLER.
NUT LOCK.

No. 594,546. Patented Nov. 30, 1897.

WITNESSES
James F. Duhamel.
Victor J. Evans.

INVENTOR,
CHARLES E. MILLER,
By John Wedderburn. Attorney

UNITED STATES PATENT OFFICE.

CHARLES E. MILLER, OF OBED, TENNESSEE, ASSIGNOR OF ONE-HALF TO GEORGE B. DURELL, OF HARRIMAN, TENNESSEE.

NUT-LOCK.

SPECIFICATION forming part of Letters Patent No. 594,546, dated November 30, 1897.

Application filed November 27, 1896. Serial No. 613,508. (No model.)

*To all whom it may concern:*

Be it known that I, CHARLES E. MILLER, a citizen of the United States, residing at Obed, in the county of Morgan and State of Tennessee, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks, and has more particular relation to locks of the automatically-operating type.

The invention consists of certain novel constructions, all of which will be hereinafter more particularly set forth and claimed.

Figure 1:
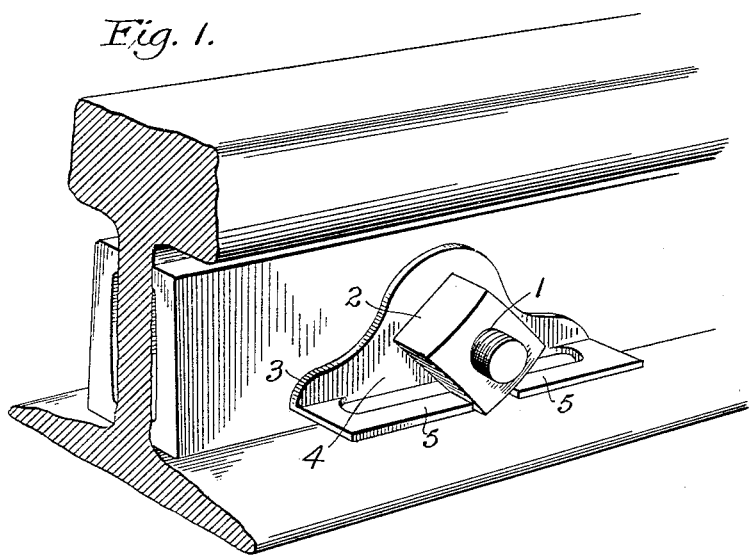
Figure 2:
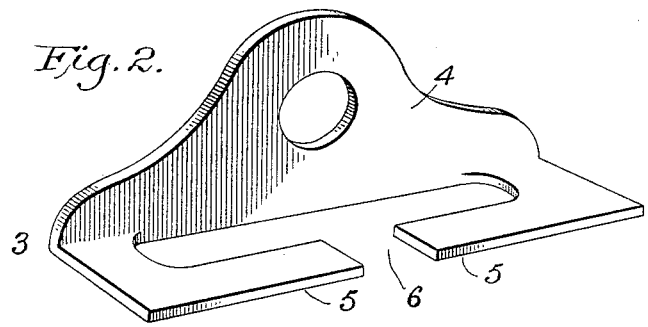

In the accompanying drawings, forming part of this specification, Figure 1 represents a perspective view of the device embodying my invention applied in position, and Fig. 2 represents a similar view of said device separated from the bolt-nut.

1 in the drawings represents the bolt, 2 the nut, and 3 the improved nut-lock. This latter comprises an apertured plate 4 and two spring-arms 5 5, formed at the opposite ends of said plate and bent at right angles thereto, so that their free inner ends lie approximately under the aperture in the plate 4. The length of said arms 5 5 is such as to leave a nut-receiving space 6 between the said free ends.

It will be observed from the foregoing description that when the nut 2 is applied in position upon the bolt rotation of the same will cause the arms 5 5 to be pressed successively downward as the corners of said nut engage the same. After the nut has been adjusted to the desired position one of its corners rests in the space 6, with the free ends of the spring-arms 5 5 bearing firmly against the sides of the said nut to hold the same securely in position against any accidental displacement.

It will further be observed that by the peculiar construction of the spring-arms 5 5 the nut is held from rotation in either direction.

By my improved construction I provide a simple, cheap, and effective nut-lock that may be readily stamped or pressed from spring sheet metal and one which will firmly hold the nut in the desired position, but at the same time permit the same to be loosened or tightened by the application of sufficient force to overcome the tension of the spring-arms.

Having thus described my invention, what I claim as new is—

A nut-lock, comprising a washer provided with a bolt-aperture and two spring-arms connected to its respective opposite ends and bent at right angles thereto, and extending toward each other, so as to lie with their respective ends approximately under the bolt-aperture, but leave sufficient space for the reception of the angular corner of a nut between them, substantially as described.

In testimony whereof I have signed this specification in the presence of two subscribing witnesses.

CHARLES E. MILLER.

Witnesses:
G. A. SHAW,
S. H. KELLER.